(12) United States Patent
McReynolds (10) Patent No.: US 11,732,462 B2
(45) Date of Patent: Aug. 22, 2023

(54) BELOW-GRADE EXPANDABLE SHELTER

(71) Applicant: Matthew McReynolds, Yukon, OK (US)

(72) Inventor: Matthew McReynolds, Yukon, OK (US)

( * ) Notice: Subject to any disclaimer, the term of this patent is extended or adjusted under 35 U.S.C. 154(b) by 0 days.

(21) Appl. No.: 17/516,216

(22) Filed: Nov. 1, 2021

(65) Prior Publication Data
US 2023/0132608 A1    May 4, 2023

(51) Int. Cl.
*E04B 1/343* (2006.01)
*E04H 9/14* (2006.01)

(52) U.S. Cl.
CPC .......... *E04B 1/34305* (2013.01); *E04H 9/14* (2013.01); *E04B 2001/34394* (2013.01); *Y02A 50/00* (2018.01)

(58) Field of Classification Search
CPC .............. E04B 1/3431; E04B 1/34305; E04B 2001/34394; E04B 1/3445; E04H 9/14; E06B 3/5063; B66F 7/0675; B66F 3/22; Y02A 50/00
See application file for complete search history.

(56) References Cited

U.S. PATENT DOCUMENTS

| | | | |
|---|---|---|---|
| 6,910,230 B1 * | 6/2005 | Schimmel | E03D 7/00 4/479 |
| 10,538,908 B1 * | 1/2020 | Wilson | E04H 9/14 |
| 2014/0259976 A1 | 9/2014 | Bowers et al. | |
| 2017/0342728 A1 | 11/2017 | Wensel | |

* cited by examiner

*Primary Examiner* — Andrew J Triggs
(74) *Attorney, Agent, or Firm* — Dunlap Codding, P.C.

(57) ABSTRACT

A shelter system having a stationary section configured to be positioned below grade and having a plurality of perimeter walls forming a stationary frame. A plurality telescoping sections are nested within the stationary section. A roof panel is attached to a top telescoping section of the plurality telescoping sections. A lift system is configured to provide a vertical force to the top telescoping section such that the plurality of telescoping sections are selectively positionable between an idle configuration below grade and a raised configuration above grade.

20 Claims, 9 Drawing Sheets

BELOW-GRADE EXPANDABLE SHELTER

CROSS REFERENCE TO RELATED APPLICATIONS/INCORPORATION BY REFERENCE STATEMENT

Not Applicable.

STATEMENT REGARDING FEDERALLY SPONSORED RESEARCH OR DEVELOPMENT

Not Applicable.

BACKGROUND

Storm shelters are designed to protect occupants and articles and withstand violent severe weather, such as tornadoes. These shelters are typically seen in the Midwestern and Southeastern United States in areas known for tornadic activity. Such shelters may also be used for other events including bomb shelters, and the like.

Generally, storm shelters are built within or close to a home or business providing access in an emergency situation. There are several different types of storm shelters with each providing an enclosed space capable of withstanding violent severe weather. For example, some storm shelters are positioned entirely underground; however, such placement is more than a typical basement and provides overhead cover that withstands removal from a severe storm. Underground storm shelters, however, may be subject to flooding during severe weather. Some storm shelters are positioned above ground as a "safe room". Safe rooms can provide a shelter where groundwater tables may make it difficult to build the shelter below ground, for example. Safe rooms, however, as above ground structures may be intrusive in day to day life. As such, there exists a need for a storm shelter capable of providing protection to occupants and articles without intruding on day to day life.

DETAILED DESCRIPTION

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary and not exhaustive. Also, it is to be understood that the phraseology and terminology employed herein is for the purpose of description and should not be regarded as limiting.

Unless otherwise defined herein, scientific and technical terms used in connection with the presently disclosed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification.

All patents, published patent applications, and non-patent publications mentioned in the specification are indicative of the level of skill of those skilled in the art to which this presently disclosed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions, assemblies, systems, and/or methods disclosed herein can be made and executed without undue experimentation in light of the present disclosure. While the compositions, assemblies, systems, and methods of the inventive concept(s) have been described in terms of particular embodiments, it will be apparent to those of skill in the art that variations may be applied to the compositions and/or methods and in the steps or in the sequence of steps of the methods described herein without departing from the concept, spirit, and scope of the inventive concept(s). All such similar substitutions and modifications apparent to those skilled in the art are deemed to be within the spirit, scope, and concept of the inventive concept(s) as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. For example, the term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

Generally, the systems and methods provided herein are configured to provide an enclosure for one or more occupants and/or articles. For example, the systems and methods may provide an enclosure for one or more humans for protection from external sources (e.g., adverse weather event, bomb event, and the like). Generally, at least a portion of the system is at least partially positioned below-grade. In some embodiments, the system may be expandable from a collapsed position to an expanded position. In some embodiments, the system is at least partially below-grade such that in a collapsed position, the system is substantially flush with the surrounding grade, and in an expanded position, the system is above grade to provide for one or more users to enter the system.

Figure 1:
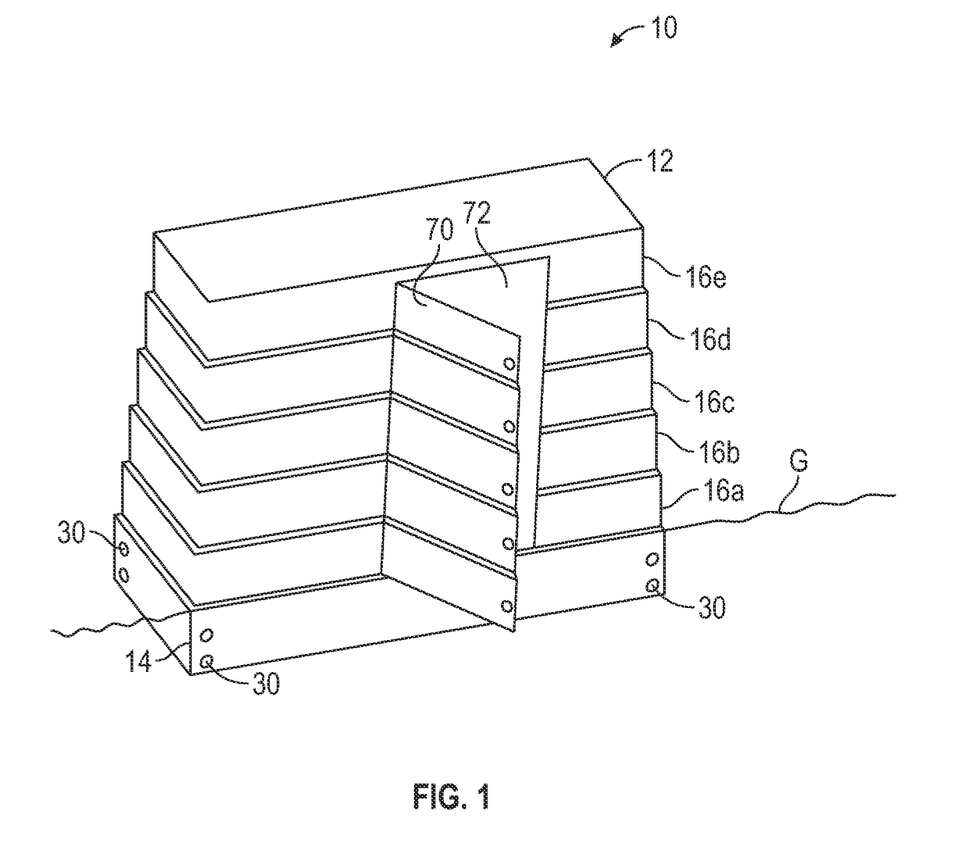
FIG. 1 is a perspective view of an exemplary embodiment of shelter system positioned in an expanded configuration in accordance with the present disclosure.

Referring to the Figures, and in particular FIG. 1, illustrated therein is an exemplary shelter system 10 in an expanded configuration and configured to provide an enclosure for one or more occupants and/or articles. The shelter system 10 includes a housing 12 having one or more stationary sections 14 configured to be positioned below-grade (i.e., below ground level G) during use and at least one or more telescoping sections 16 configured to be positioned on-grade (i.e., at ground level G) or above-grade (i.e., above ground level G) with the shelter system 10 in the expanded configuration. For example, as illustrated in FIG. 1, the stationary section 14 is positioned below grade, a first telescoping section 16a is positioned on-grade, and telescoping sections 16b-16e are positioned above grade forming the housing 12.

Figure 2A:
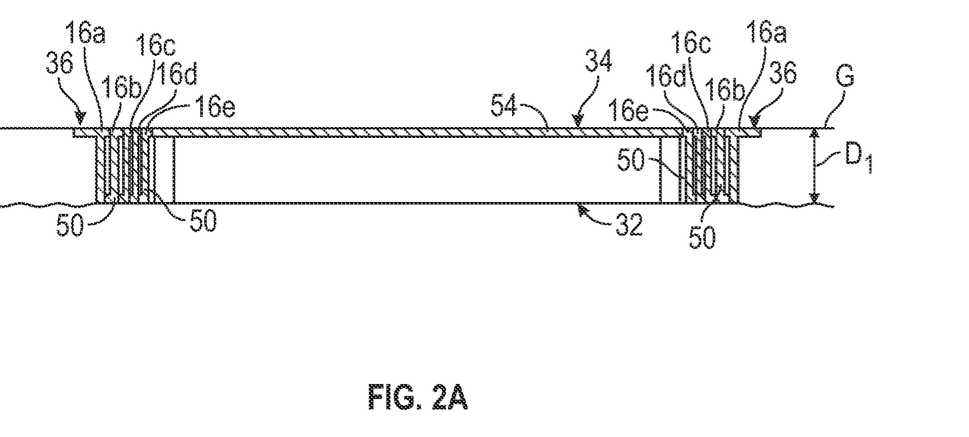
FIG. 2A is a side view of the shelter system illustrated in FIG. 1. The shelter system is positioned in an idle configuration in accordance with the present disclosure.
Figure 2B:
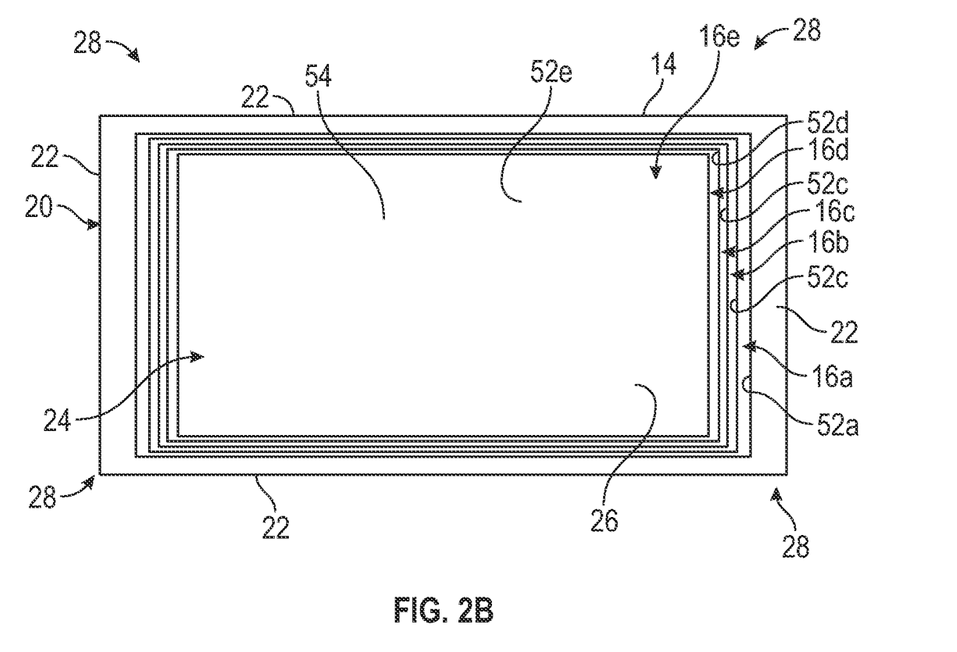
FIG. 2B is a top down view of the shelter system illustrated in FIGS. 1 & 2A.

FIGS. 2A and 2B illustrate the shelter system 10 in an idle configuration. The idle configuration is used between severe weather events, for example. In some embodiments, the shelter system 10 may be positioned such that the stationary section 14 is within and attached to a concrete slab of a house (e.g., concrete slab forming the floor of a garage or dining room). In some embodiments, the shelter system 10 may be fastened or attached to the concrete slab. In some embodiments, the shelter system 10 may be positioned external to a house such that the stationary section 14 is within a hole in the ground G positioned external to a housing or building structure.

The one or more telescoping sections 16 may be nested within the stationary frame 20 when the shelter system 10 is in the idle configuration. Generally, the telescoping sections 16a-16e are of graduated size and configured to be positioned one inside the other within the stationary section 14 when the shelter system 10 is in the idle configuration. In some embodiments, the stationary section 14 may include a plurality of perimeter walls 22 connected to form the stationary frame 20, with the plurality of perimeter walls 22 defining a cavity 24. The one or more telescoping sections 16 may be nested within the cavity 24. In some embodiments, the stationary frame 20 may optionally include a bottom wall 26. The optional bottom wall 26 may provide support (i.e., perpendicular support) for the one or more telescoping sections 16. In some embodiments, one or more anchoring posts (not shown) may be attached to the one or more perimeter walls 22. Such anchoring posts may be buried within the ground G below the stationary section 14 providing additional anchoring of the housing 12 to the ground.

The perimeter walls 22 may be formed of rigid material configured to support the housing 12 within the ground G. Although the plurality of perimeter walls 22 of FIGS. 2A and 2B form a rectangular frame, it should be appreciated that the perimeter walls 22 may form any shape, including circular, square, triangular, or any fanciful shape.

Referring to FIGS. 1, 2A and 2B, in some embodiments, perimeter walls 22 may be joined at one or more corners 28 of the stationary frame 20 in any suitable manner, including but not limited to, welding, clamping, fastening, combinations thereof, and the like. For example, in some embodiments, each perimeter wall 22 may be connected at corners 28 via one or more fasteners 30 by overlapping perimeter walls 22 at the corner 28 and joining the perimeter walls 22 together via one or more fasteners 30. Fasteners 30 may include, but are not limited to, bolts, nails, screws, rivets, washers/nuts, combinations thereof or the like. In some embodiments, corners 28 of the stationary frame 20 may be welded together. In some embodiments, the perimeter walls 22 may be formed of a singular integral piece of material. In some embodiments, additional reinforcement sections (e.g., bars, additional material) may be provided along the perimeter walls 22 of the stationary section 14 and positioned sporadically or at regular intervals to provide additional support. In some embodiments, the corners 28 of the stationary frame 20 may be formed of an elastomeric material providing flexibility at each corner 28 between perimeter walls 22.

The stationary section 14 includes a lower end 32. The telescoping section 16e contains an upper end 34. The lower end 32 of the stationary section 14 is positioned below grade at a distance $D_1$ (e.g., 13 inches) from ground level G. The upper end 34 of the telescoping section 16e is positioned at about ground level G, e.g., preferably within ½ inch plus or minus of ground level. The one or more telescoping sections 16 may be nested within the stationary frame 20 of the stationary section 14 such that in the idle configuration of the shelter system 10 the one or more telescoping sections 16 are positioned between the lower end 32 of the stationary section 14 and the upper end 34 of the telescoping section 16e. Each telescoping section 16 may include joint walls 50 forming an inner frame 52a-52e. Each inner frame 52a-52e may have a slightly smaller perimeter such that telescoping section 16a-16e may be nested within the stationary frame 20 of the stationary section 14 and at least one adjacent telescoping section 16. In some embodiments, the joint wall 50 may have a height of approximately 12 inches. The telescoping section 16e positioned furthest from the ground level G may also include a roof panel 54 attached to each of the joint walls 50 of the inner frame 52e. The telescoping section 16e is referred to herein as a top telescoping section. Panel 54 may cover the entire perimeter of the system 10.

In some embodiments, the upper end 34 of the stationary section 14 may include one or more overhangs 36 to assist in mounting the upper end 34 to ground level G, e.g., a concrete slab. Each overhang 36 may be integral to one or more perimeter walls 22 (e.g., formed at the same time from a singular mold) or attached to one or more perimeter walls 22. In some embodiments, each overhang 36 may include a plurality of openings (not shown) to receive anchors configured to secure the stationary section 14 to ground level G. For example, in some embodiments, the overhang 36 may be anchored to a concrete slab of a house or building structure such that the stationary section 14 is positioned below grade and anchoring of the overhang 36 is at ground level G.

Figure 2C:
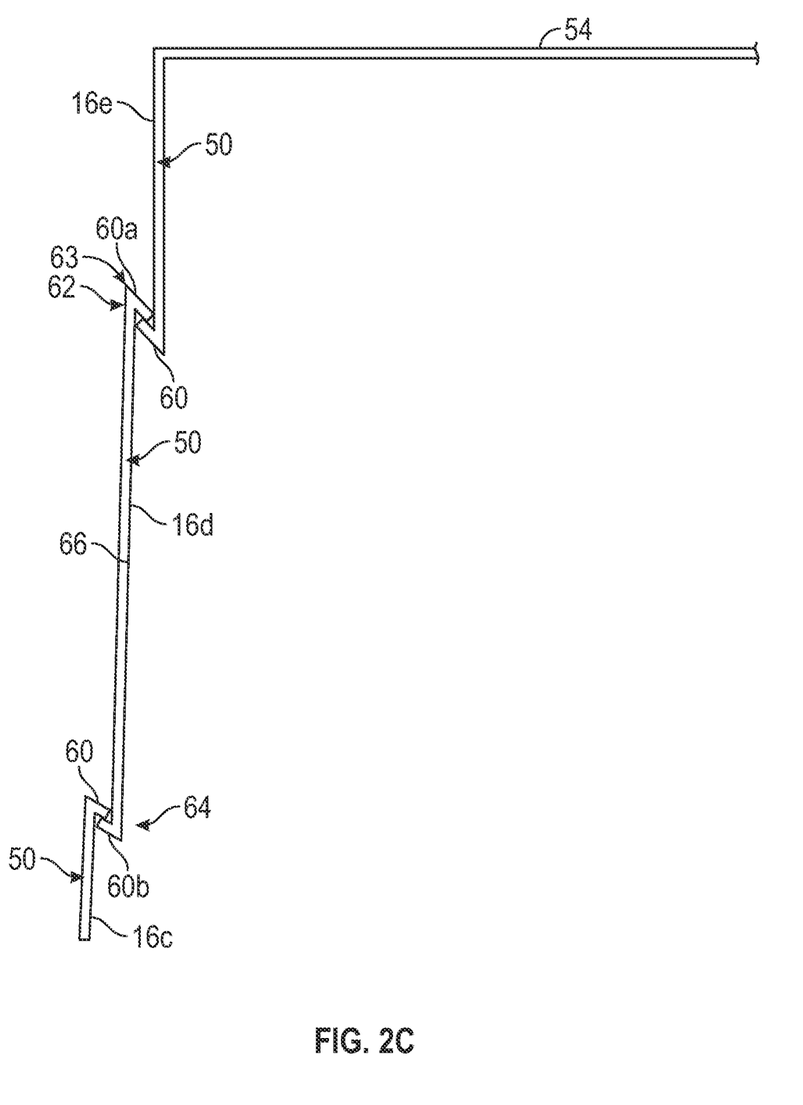
FIG. 2C is simplified diagrammatic view of a plurality of exemplary joint walls connected via exemplary angled rods.

FIG. 2C illustrates joinder between the joint walls 50 of the housing 12 in the expanded configuration. Generally, one or more of edges of the joint walls 50 may be formed by curling or bending such that each telescoping section 16a-16e may engage when moving to and positioned in the expanded configuration. Each joint wall 50 may comprise one or more angled rods 62 extending from a first end 63 and/or a second end 64 of a shaft 66. The shaft 66 may be formed of a rigid material (e.g. metal) configured to support the housing 12 in the expanded configuration. In some embodiments, the shaft 66 may have a thickness of approximately 0.25 inches. For example, in some embodiments, the shaft 66 may be formed of steel having a thickness of approximately 0.25 inches. In some embodiments, the shaft 66 and one or more angled rods 62 may be integrally connected (i.e., formed via conventional metal forming processes). In some embodiments, one or more angled rods 62 may be attached to the shaft 66 (e.g., via welding).

Each angled rod 62 is configured to connect with adjacent angled rods 62. FIG. 2C illustrates the angled rod positioned at a 90 degree angle. For example, in FIG. 2C, the joint wall 50 comprises a first angled rod 60a extending from the first end 63 and a second angled rod 62 extending from the second end 64 of the shaft 66. Angled rods 62 may extend at an angle at about 90 degrees or less from the shaft 66. In some embodiments, angled rods 62 may include other shapes including, but not limited to, right-angles shapes, J-shapes, U-shapes, V-shapes, W-shapes, and/or the like.

Figure 3A:
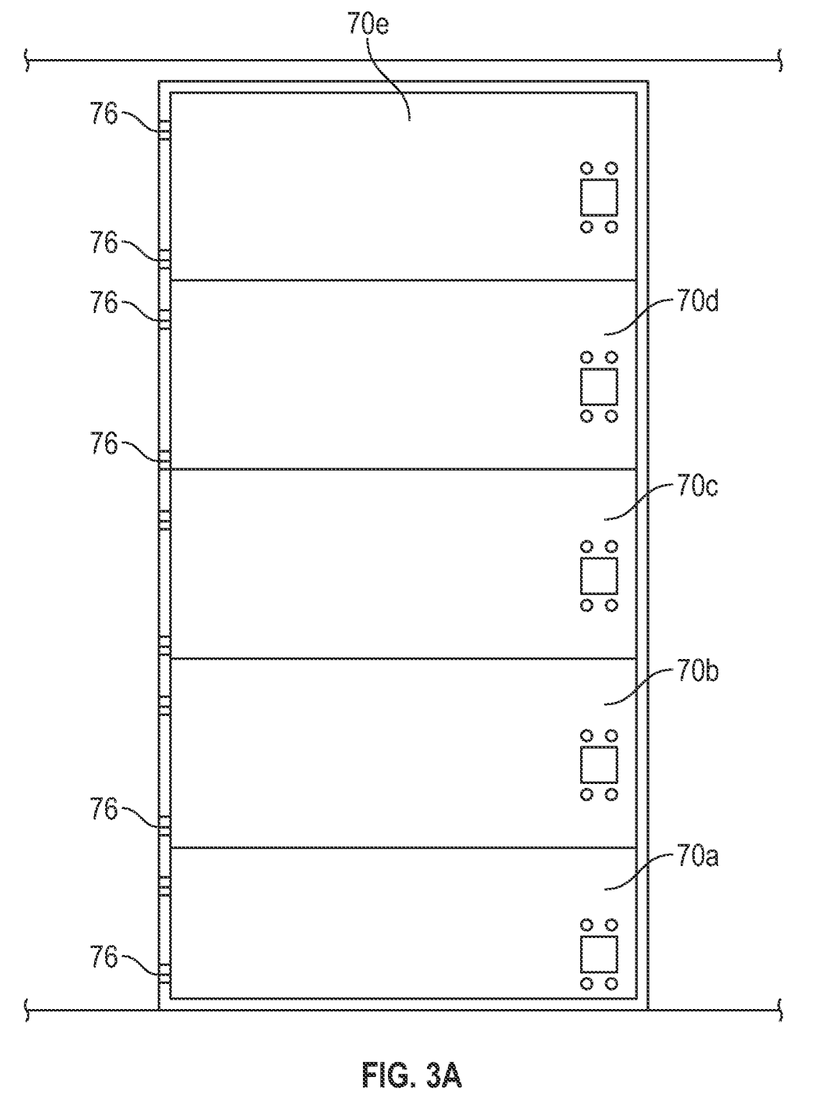
FIG. 3A is a side view of a plurality of exemplary doors in the shelter system illustrated in FIG. 1.
Figure 3B:
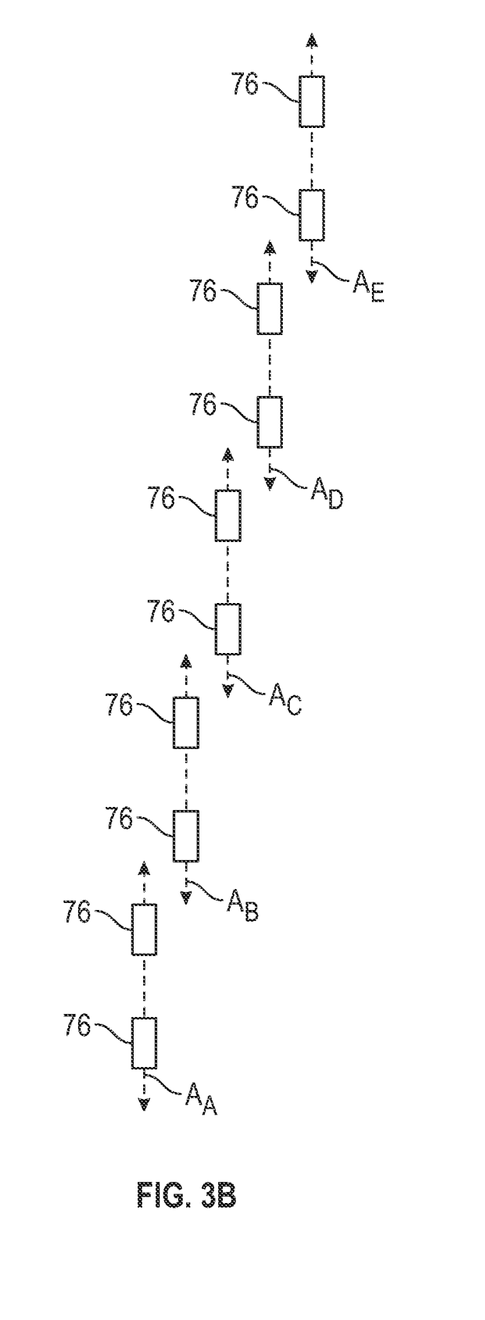
FIG. 3B-3C are simplified diagrammatic views of exemplary hinges of the doors in the shelter system illustrated in FIG. 3A.
Figure 3C:
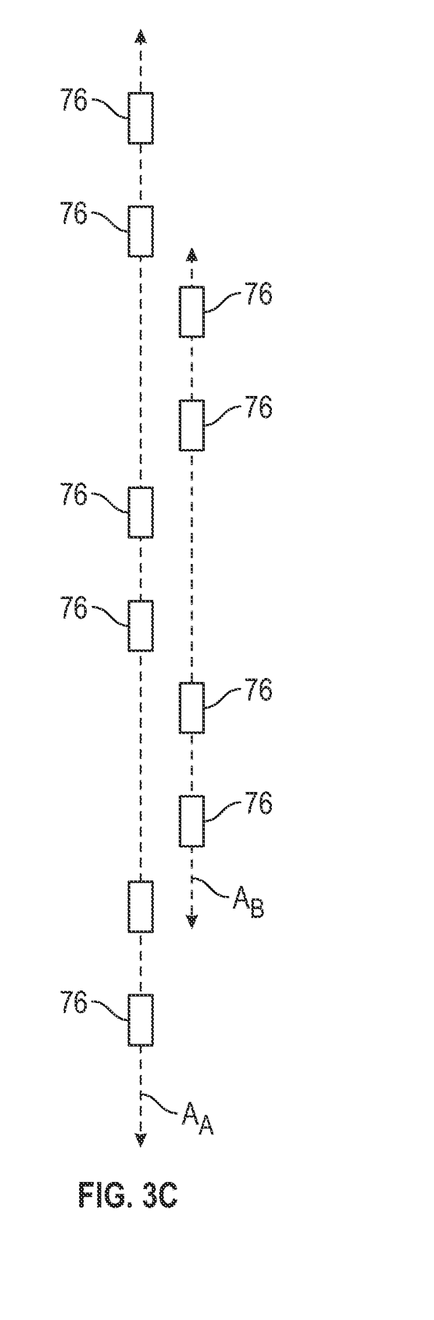

Referring to FIGS. 1, 3A and 3B, in the expanded configuration, the housing 12 provides one or more doors 70 configured to provide an opening 72. The opening 72 may be sized and constructed to provide entrance and/or exit for one or more occupants and/or articles. Each door 70 may be configured to be in an open position (shown in FIG. 1) and a closed position (shown in FIG. 3A). To that end, each door 70 may be configured to move about on one or more respective hinges 76 to be positioned in the open position and the closed position. FIG. 3A illustrates an exemplary embodiment having doors 70a-70e of each telescoping section 16a-16e including one or more hinges 76. In some embodiments, hinges 76 may be positioned such that one or more doors 70 may open simultaneously. For example, hinges 76 may be provided on a single axis such that all doors 70 may open simultaneously. In some embodiments, hinges 76 may be positioned such that each door 70 may move independently of one or more doors 70 positioned adjacent. For example, hinges 76 for each door 70 may rotate on a separate axis AA-AE as illustrated in FIG. 3B. FIG. 3C illustrates another exemplary embodiment wherein hinges 76 for each door 70 are in a staggered configuration on separate axis AA-AB.

Figure 4A:
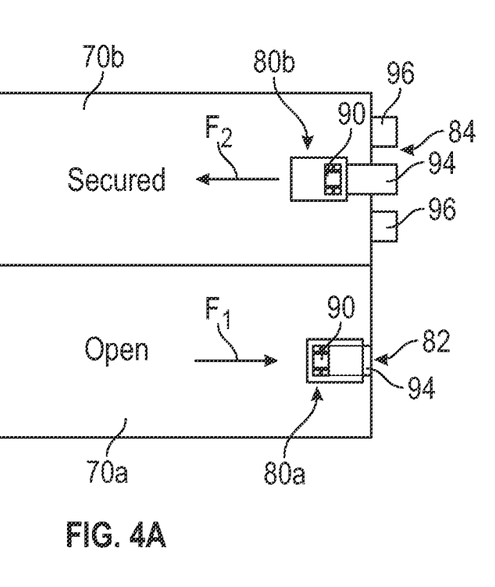
FIGS. 4A and 4B are side view of exemplary locks for the doors in the shelter system illustrated in FIG. 1.
Figure 4B:
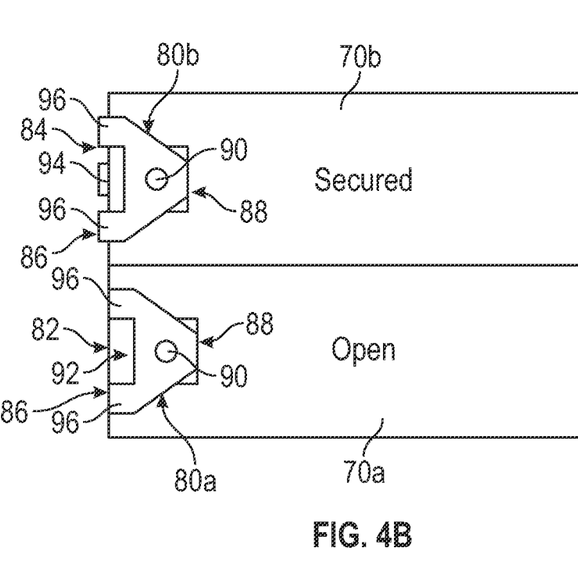

Referring to FIGS. 1, 3A, 4A and 4B, one or more doors 70 may include one or more locks 80 configured to secure each door 70 and/or all doors 70. The one or more locks 80 may be a bolt or system of bolts configured to be propelled and withdrawn by a mechanism operated by a key, dial, and/or the like. In some embodiments, one or more locks 80 may be latches. FIG. 4A illustrates an exemplary embodiment of the one or more locks 80 with the lock 80a positioned in a first open position 82 on the door 70a and the lock 80b positioned in a second secured position 84 on the door 70b. FIG. 4B illustrates the corresponding locks 80a and 80b from the inside of the housing 12. The lock 80a may include a first side 86 and a second side 88. The first side 86 may be positioned on the outside of the housing 12 and the second side 88 may be positioned on the inside of the housing 12. A bolt 90 may be threaded through an opening 92 such that the bolt 90 is in communication with one or more protrusions 94 on the first side 86 and/or one or more protrusions 96 on the second side 88 of the lock 80a. The bolt 90 may be configured to slidably move the protrusions 94 and 96 to secure each door 70. For example, using mechanical force in a first direction $F_1$, the lock 80a may be positioned from the first open position 82 to the second secured position 84. Using mechanical force in a second direction $F_2$, the lock 80a may be positioned from the second secured position 84 to the first open position 82.

Figure 5:
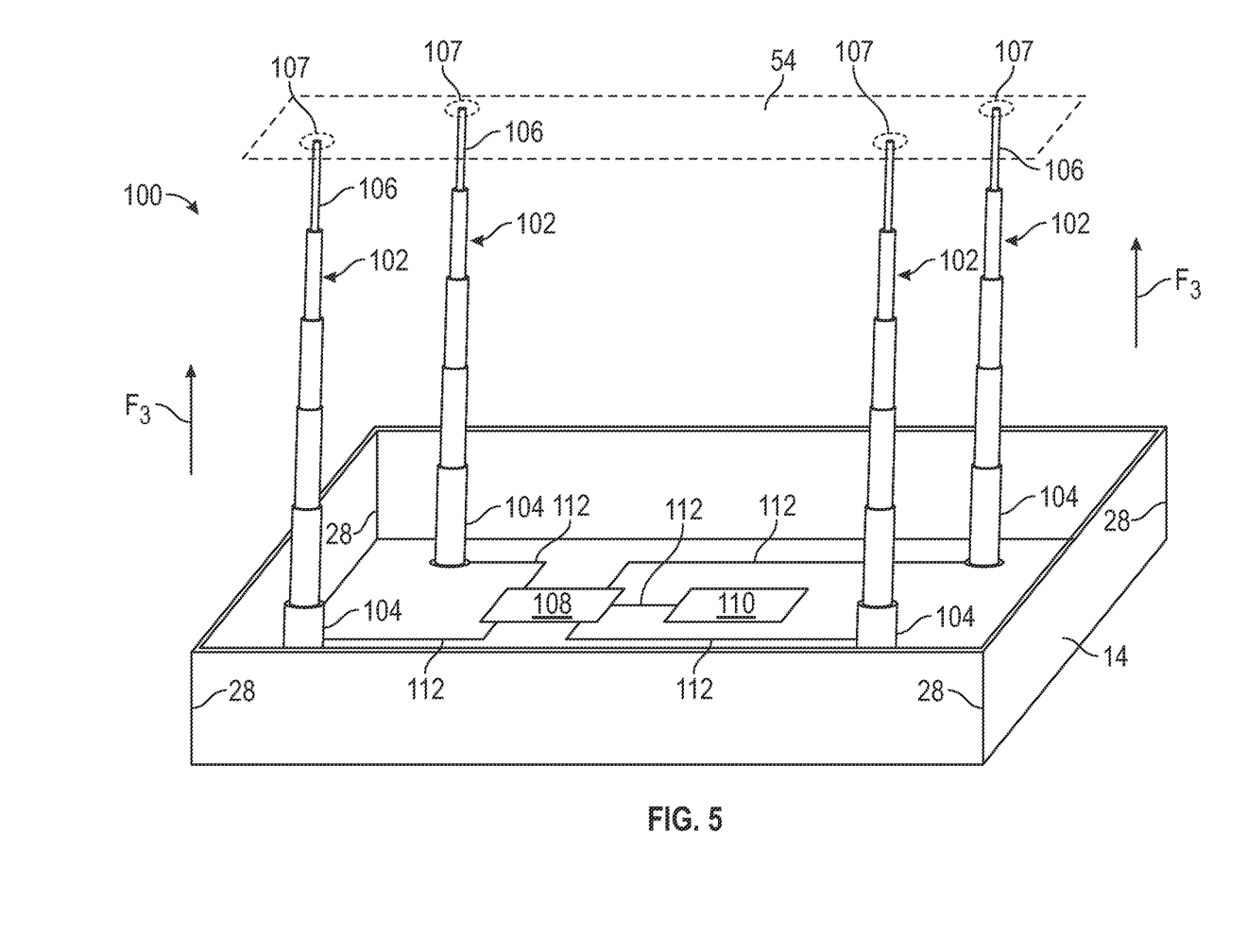
FIG. 5 is a simplified perspective view of an exemplary hydraulic cylinder system for positioning the shelter system of FIG. 1 in an expanded configuration and an idle configuration in accordance with the present disclosure.

FIG. 5 is an exemplary embodiment of a lift system, which is described by way of example as a hydraulic cylinder system 100 configured to position the housing 12 from the idle configuration to the expanded configuration in accordance with the present disclosure. Referring to FIGS. 1 and 5, generally, the hydraulic cylinder system 100 may provide a force $F_3$ to the roof panel 54 in a vertical direction in relation to the stationary section 14, raising telescoping sections 16 from the idle configuration.

The hydraulic cylinder system 100 may include one or more telescoping columns 102. For example, as illustrated in FIG. 5, the hydraulic cylinder system 100 may include four telescoping columns 102. Each telescoping column 102 may include a stationary end 104 and a working end 106. The working end 106 may be positioned on the roof panel 54. In some embodiments, the working end 106 may be attached to the roof panel 54. In some embodiments, the working end 106 may be positioned in or attached to an engagement feature 107 of the roof panel 54. In some embodiments, one or more telescoping columns 102 may be positioned near each corner 28 of the stationary section 14. In some embodiments, at least one telescoping column 102 may be positioned at the center of the stationary section 14.

One or more components of the hydraulic cylinder system 100 may be positioned within the cavity 24 of the stationary section 14. For example, the hydraulic pump 108, reservoir 110, connectors 112, filters and the like may be positioned within the cavity 24 of the stationary section 14. In some embodiments, one or more components of the hydraulic cylinder system 100 may be positioned exterior to the housing 12.

As the hydraulic cylinder system 100 applies a vertical force F to the roof panel 54, the joint wall 60 for each telescoping section 16 is also moved in the vertical direction such that each angled rod 62 of the joint wall 60 contactingly engages and/or interlocks with the adjacent angled rod 62 of the adjacent joint wall 60. When the shelter system 10 is provided in the expanded configuration, at least one telescoping columns 102 may be locked so as to provide a vertical force $F_3$ on the roof panel 54 so as to maintain the housing 12 in the expanded configuration (as shown in FIG. 1).

To lower the housing 12 from the expanded configuration to the idle configuration, the vertical force $F_3$ may be reduced sufficiently such that the force of gravity overcomes the vertical force $F_3$. The roof panel 54 begins to lower under control of the vertical force $F_3$ as the engaged and/or interlocking angled rods 62 disconnect. The telescoping sections 16 are positioned in the nested position within the stationary section 14. Although the lift system is described by way of example as the hydraulic cylinder system 100, other manners of making the mechanical lift system may be employed, such as a vertical reciprocating conveyor. Exemplary vertical reciprocating conveyors include mechanical lifts and hydraulic lifts.

Figure 6:
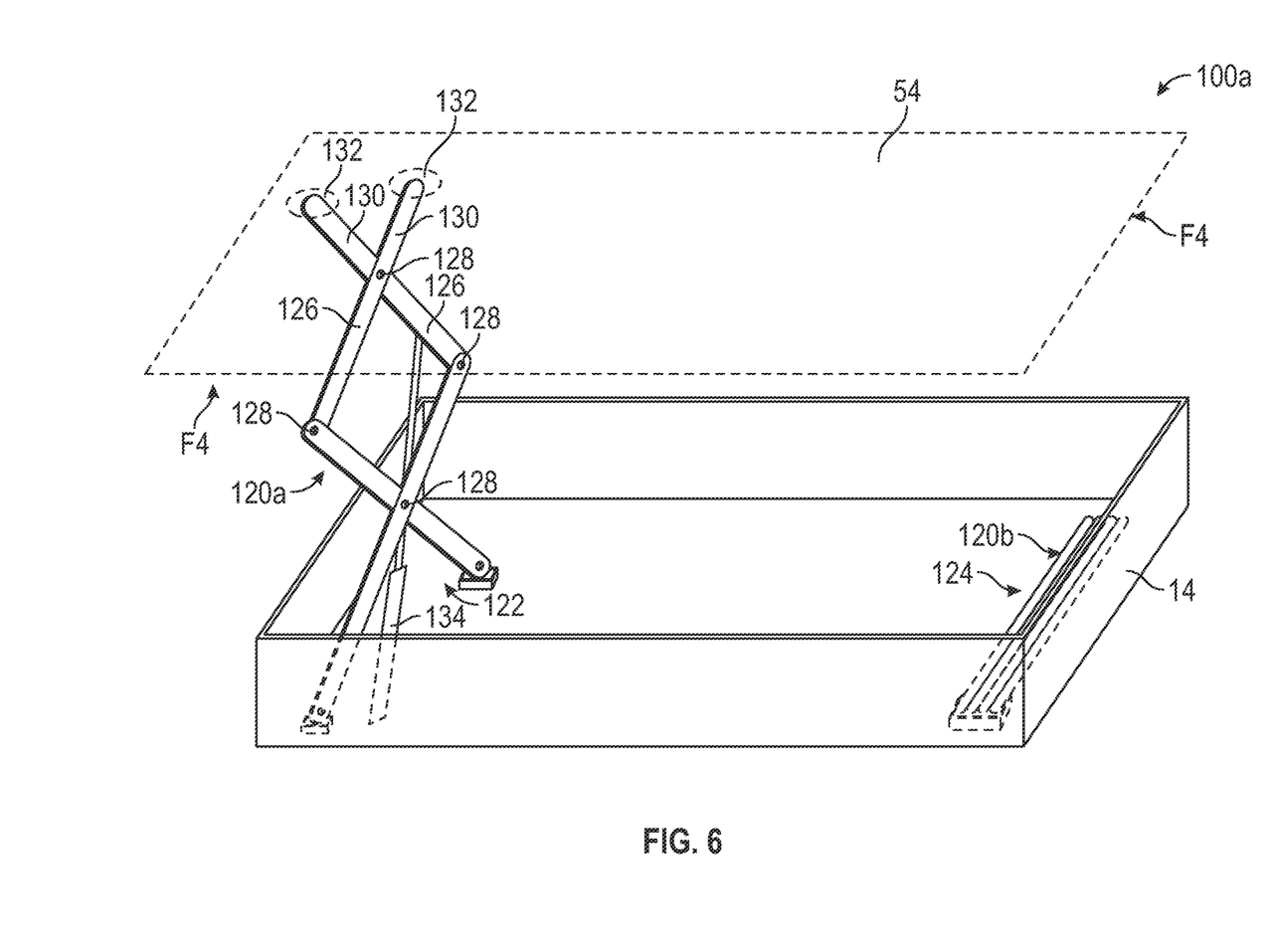
FIG. 6 is a simplified perspective view of another exemplary hydraulic cylinder system for positioning the shelter system of FIG. 1 in an expanded configuration and an idle configuration in accordance with the present disclosure.

FIG. 6 is another exemplary embodiment of a lift system, which is described by way of example as a hydraulic cylinder system 100a configured to position the housing 12 from the idle configuration to the expanded configuration in accordance with the present disclosure. Referring to FIGS. 1 and 5, generally, the hydraulic cylinder system 100a may provide a force $F_4$ to the roof panel 54 in a vertical direction in relation to the stationary section 14, raising the telescoping sections 16 from the idle configuration.

The hydraulic cylinder system 100a includes one or more scissor lifts 120 positioned within the stationary section 14. For example, in FIG. 6 the hydraulic cylinder system 100a includes a first scissor lift 120a and a second scissor lift 120b. The first scissor lift 120a is positioned at a first end 122 of the stationary section 14 and the second scissor lift 120b is positioned at a second end 124 opposite of the first end 122 of the stationary section 14. As illustrated, the first scissor lift 120a is in an expanded configuration and the second scissor lift 120b is in a retracted configuration.

Each scissor lift 120 includes a set of cross-braced arms 126 configured to expand and contract to apply the force $F_r$ to the roof panel 54. The cross-based arms 126 are hinged with one or more pivot points 128. Length of each cross-braced arm 126 may be determined by design considerations for height of the shelter system 10. The cross-braced arms 126 may raise the roof panel 54 as the cross-braced arms 126 constrict and lower the roof panel 54 as the cross-braced arms 126 expand. In some embodiments, at least one end 130 of the cross-braced arms 126 may be positioned or attached to an engagement feature 132 (e.g., hinge) of the roof panel 54. In some embodiments, at least one end 130 of the cross-braced arms 126 may be directly positioned or attached to the roof panel 54.

The hydraulic cylinder system 100a may include one or more cylinders 134. Cylinders 134 are attached to the cross-braced arms 126 such that increase or reduction of pressure through the cylinders 134 actuates raising or lowering of the cross-braced arms 126 and roof panel 54. For example, an increase in pressure through the cylinders 134 applies pressure to the cross-braced arms 126 causing the cross-braced arms 126 to expand about the pivot points 128 applying force $F_4$ to the roof panel 54 in the vertical direction in relation to the stationary section 14, raising the telescoping sections 16 from the idle configuration. A decrease in pressure through the cylinders 134 reduces pressure to the cross-braced arms 126 allowing the cross-braced arms 126 to constrict about the pivot points 128 lowering the roof panel 54 towards the stationary section 14 such that the telescoping sections 16 are placed in the idle configuration.

Although the lift system is described by way of example as the hydraulic cylinder system 100a, other manners of making the scissor lift 120 may be employed, such as a pneumatic lift system, electric lift system, diesel lift system, or the like.

Figure 7:
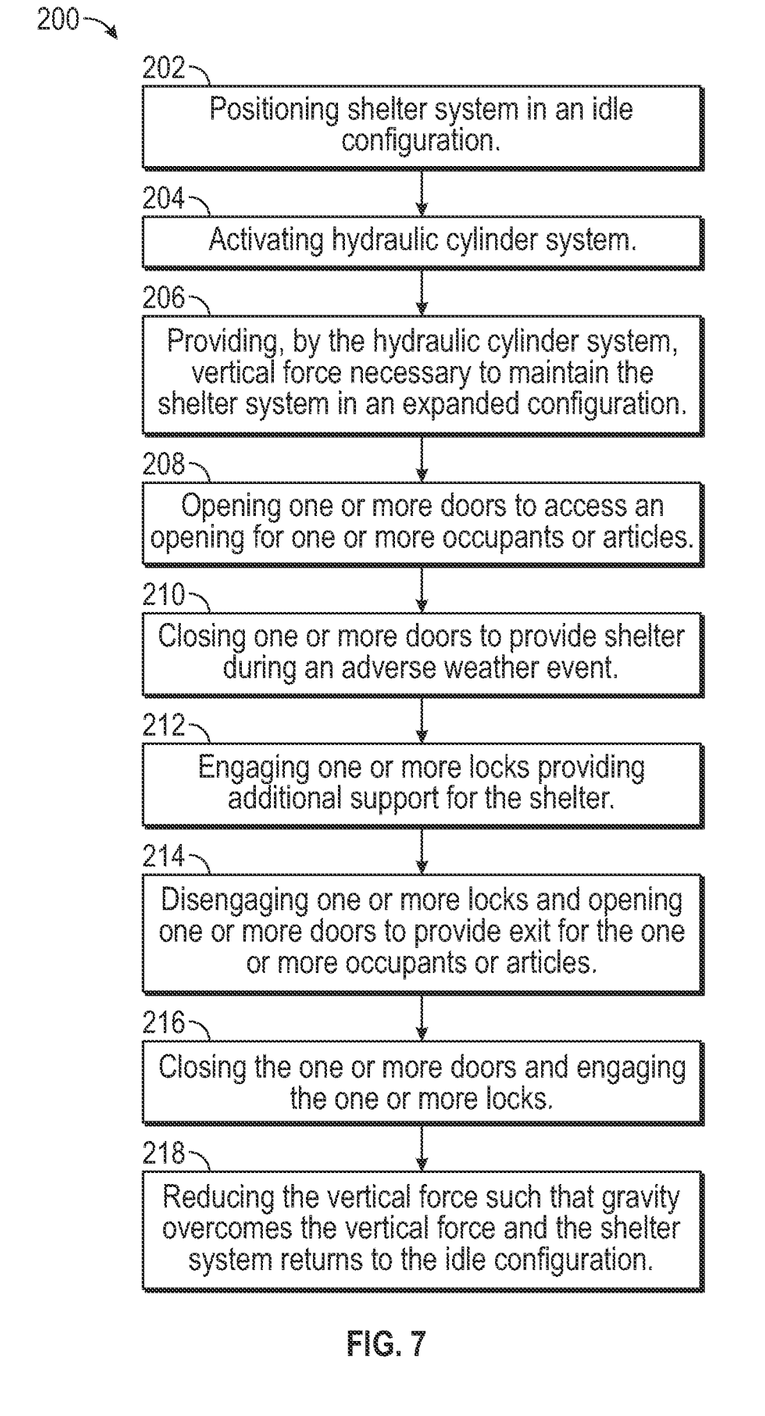
FIG. 7 is a flow chart of exemplary method of using a storm shelter in accordance with the present disclosure.

FIG. 7 is a flow chart 200 of an exemplary method of using the shelter system 10 in accordance with the present disclosure. Generally, the shelter system 10 is selectively positioned between the idle configuration and the expanded configuration. In a step 202, the shelter system 10 may be positioned in the idle configuration. In some embodiments, the idle configuration may be such that the housing 12 of the shelter system 10 is flush with ground level G (e.g., floor).

For example, the roof panel 54 may be at, just above, or just below the ground level G when the shelter system 10 is positioned in the idle configuration. In some embodiments, a top of the roof panel 54 may be within plus or minus 1 inch of the ground level G. In some embodiments, a section of Earth or concrete may be removed to accommodate the stationary section 14 of the housing such that the roof panel 54 is positioned flush with the ground level G or floor. The overhangs 36 at the upper end 34 may be placed against the ground level G or floor, and then secured in place with mechanical fasteners, such as concrete screws. In some embodiments, the stationary section 14 may be optionally attached to the foundation of a building using concrete screws, for example.

In a step 204, the hydraulic cylinder system 100 may be activated by a user. With the hydraulic cylinder system 100 activated, the lift system, e.g., one or more telescoping columns 102 apply a vertical force to the roof panel 54 of the telescoping section 16e. Application of the vertical force $F_3$ to the roof panel 54 raises the telescoping sections 16 by having each angled rod 52 engage with the adjacent angled rod 52 such that joint walls 50 are raised in the upward direction.

In a step 206, the hydraulic cylinder system 100 may be locked, thereby providing a vertical force necessary to maintain the housing 12 in the expanded configuration (as shown in FIG. 1). In some embodiments, the housing 12 may have a height of 72 inches in the expanded configuration.

In a step 208, one or more doors 70 may be opened to provide access via the opening 72 to an interior area. In a step 210, the one or more doors 70 may be closed to provide shelter to the one or more persons or articles. In a step 212, the one or more locks 80 may be engaged providing additional support to the housing 12.

In a step 214, the one or more locks 80 may be disengaged, the one or more doors 70 opened, and the one or more persons or articles may exit the housing via the opening 72. In a step 216, the one or more doors 70 may be closed and the one or more locks 80 reengaged. In a step 218, the vertical force $F_3$ applied to the roof panel 54 may be reduced such that gravity overcomes the vertical force $F_3$ and the roof panel 54 may be lowered. With the roof panel 54 being lowered, the angled rods 62 of each joint wall may disengage and the telescoping sections 16 may be nested within the stationary section 14 such that the housing 12 is provided in the idle configuration.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A shelter system, comprising:
   a stationary section configured to be positioned below grade and having a plurality of perimeter walls forming a stationary frame, the stationary frame having a first perimeter;
   a plurality of nested and linked telescoping sections with each telescoping section having a plurality of joint walls forming a frame, the frame having a perimeter less than the first perimeter, the nested and linked telescoping sections configured to be nested within the stationary section;
   a roof panel attached to a top telescoping section of the plurality of nested and linked telescoping sections; and,
   a lift system configured to provide a vertical force to the top telescoping section such that the plurality of nested and linked telescoping sections are selectively positionable between an idle configuration below grade and a raised configuration above grade.

2. The shelter system of claim 1, wherein the plurality of nested and linked telescoping sections comprise:
   a first telescoping section having a first plurality of joint walls forming a first frame; and,
   a second telescoping section having a second plurality of joint walls forming a second frame.

3. The shelter system of claim 2, wherein each joint wall comprises:
   a shaft with a first end and a second end; and,
   at least one angled rod attached to the shaft.

4. The shelter system of claim 3, wherein the joint wall comprises a first angled rod attached to the first end of the shaft and a second angled rod attached to the second end of the shaft.

5. The shelter system of claim 3, wherein the angled rod is attached at a 90 degree angle relative to the shaft.

6. The shelter system of claim 3, wherein the angled rod is a J-shaped rod.

7. The shelter system of claim 1, wherein the stationary frame has a first end and a second end, the stationary section further comprising at least one overhang attached to at least one perimeter wall of the plurality of perimeter walls at the first end of the stationary frame.

8. The shelter system of claim 7, wherein the overhang is configured to be anchored to a concrete slab.

9. The shelter system of claim 8, wherein the overhang is positionable at ground level.

10. The shelter system of claim 7, wherein the stationary section further comprises a second overhang attached to at least one perimeter wall of the plurality of perimeter walls at the second end of the stationary frame.

11. The shelter system of claim 7, wherein the at least one overhang is integral with at least one perimeter wall.

12. The shelter system of claim 1, wherein at least one telescoping section of the plurality of nested and linked telescoping sections includes a door configured to provide an opening.

13. The shelter system of claim 1, wherein the plurality of nested and linked telescoping sections have a plurality of doors, with the plurality of doors of the telescoping sections configured to collectively provide a single opening.

14. The shelter system of claim 13, wherein each door includes at least one hinge and hinges from the plurality of doors are positioned to rotate on a single axis.

15. The shelter system of claim 13, wherein each door of the plurality of doors includes at least one hinge and hinges from the plurality of doors are positioned to rotate about separate axis.

16. The shelter system of claim 13, wherein each door of the plurality of doors includes at least one hinge and hinges from the plurality of doors are positioned to rotate on staggered axis.

17. A shelter system, comprising:
    a stationary section configured to be positioned below grade, the stationary section including:

a plurality of perimeter walls forming a stationary frame with a lower end and an upper end, the stationary frame having a first perimeter; and, at least one overhang attached to at least one perimeter wall of the plurality of perimeter walls at the upper end of the stationary frame;

a plurality of nested and linked telescoping sections having a plurality of joint walls forming a frame, the frame having a perimeter less than the first perimeter such that at least one telescoping section is configured to be nested within the stationary section;

a roof panel attached to a top telescoping section of the plurality of nested and linked telescoping sections; and, a lift system connected to the top telescoping section and configured to provide a vertical force to the top telescoping section such that the plurality of nested and linked telescoping sections are selectively positionable from below grade in an idle configuration to above grade in an expanded configuration with the stationary section remaining below grade, the nested and linked telescoping sections surrounding a room in the expanded configuration.

18. The shelter system of claim 17, wherein each telescoping section includes a door, the doors of the telescoping sections collectively forming an opening configured to provide access to the room.

19. The shelter system of claim 18, wherein each door includes at least one hinge, and hinges from the doors are configured on a single axis.

20. A method of using a shelter system, comprising:

positioning the shelter system in an idle configuration, the idle configuration having at least one stationary section of the shelter system having a plurality of perimeter walls forming a stationary frame, and a plurality of nested and linked telescoping sections positioned below grade with each nested and linked telescoping section having a plurality of joint walls forming a frame, the plurality of nested and linked telescoping sections nested within the stationary section; and lifting a top telescoping section and the plurality of telescoping sections of the plurality of nested and linked telescoping sections to an expanded configuration above grade such that the plurality of joint walls of the plurality of telescoping sections form a room.

* * * * *